US008000867B2

(12) United States Patent
Lee

(10) Patent No.: US 8,000,867 B2
(45) Date of Patent: Aug. 16, 2011

(54) SYSTEM FOR AUTOMATICALLY LANDING AIRCRAFT USING IMAGE SIGNALS AND METHOD OF CONTROLLING THE SAME

(75) Inventor: Hyeon-Cheol Lee, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 146 days.

(21) Appl. No.: 12/363,185

(22) Filed: Jan. 30, 2009

(65) Prior Publication Data

US 2010/0057278 A1 Mar. 4, 2010

(30) Foreign Application Priority Data

Sep. 3, 2008 (KR) .................. 10-2008-0086782

(51) Int. Cl.
*G06F 19/00* (2006.01)
*G01S 19/15* (2010.01)
*G01S 19/20* (2010.01)

(52) U.S. Cl. .............. 701/58; 342/357.53; 342/358

(58) Field of Classification Search .............. 701/1–18, 701/28; 340/946–983; 342/2, 4, 26 B, 25 A–25 F, 342/29–174; 244/17.17, 54, 75.1–76 R, 244/174–191

See application file for complete search history.

(56) References Cited

U.S. PATENT DOCUMENTS

| | | | | |
|---|---|---|---|---|
| 3,746,846 A * | 7/1973 | Weihe | ............ | 701/300 |
| 4,792,904 A * | 12/1988 | Reinagel et al. | ............... | 701/17 |
| 5,235,513 A * | 8/1993 | Velger et al. | .................. | 701/16 |
| 5,593,114 A * | 1/1997 | Ruhl | ............................ | 244/183 |
| 6,154,693 A * | 11/2000 | Aberschitz et al. | ........... | 701/16 |
| 6,409,121 B1 * | 6/2002 | Lindahl | .................... | 244/100 R |
| 7,671,761 B2 * | 3/2010 | Lapp | ............................ | 340/977 |
| 2004/0121071 A1 * | 6/2004 | Loyd et al. | ................... | 427/212 |
| 2005/0230564 A1 * | 10/2005 | Yamane | ...................... | 244/183 |

* cited by examiner

*Primary Examiner* — James P Trammell
*Assistant Examiner* — Muhammad Shafi
(74) *Attorney, Agent, or Firm* — Rabin & Berdo, P.C.

(57) ABSTRACT

Disclosed herein are a system for automatically landing an aircraft using image signals and a method of controlling the system. The system includes an altimeter installed on the aircraft; a landing mark placed at a landing location on a landing runway; a camera installed on the aircraft, oriented toward the front of the aircraft, and configured to detect the shape of the landing mark in image information form; and a FCC configured to calculate the angle between the aircraft and the ground, the ground range and the slant range between the aircraft and the landing location using the altitude information measured by the altimeter, the image information of the landing mark captured by the camera, angle information composed of the pitch, roll and yaw angles of the aircraft, and the angle of entry into the landing runway, and configured to control the automatic landing of the aircraft.

5 Claims, 5 Drawing Sheets

SYSTEM FOR AUTOMATICALLY LANDING AIRCRAFT USING IMAGE SIGNALS AND METHOD OF CONTROLLING THE SAME

BACKGROUND OF THE INVENTION

1. Field of the Invention

The present invention relates generally to a system for automatically landing an aircraft using image signals, and, more particularly, to a system for automatically landing an aircraft using image signals and a method of controlling the system, which are capable of automatically landing an aircraft at a landing location using a landing mark provided at the landing location and imaging equipment configured to detect the landing mark.

2. Description of the Related Art

In order to land an aircraft, particularly an unmanned aircraft, a landing method based on an external pilot's control, a landing method using a parachute or a net and an automatic landing method using an Instrument Landing System (ILS) have been used.

However, the landing methods require the maintenance of additional manpower and the provision of additional facilities. In order to solve these problems, a way of automatically landing an unmanned aircraft by radar has been used.

In detail, this prior art system for automatically landing an aircraft uses a technique of radiating radar waves from the ground to the unmanned aircraft by radar, calculating the distance between the unmanned aircraft and a landing runway by determining the time of arrival of the radar waves, and controlling the unmanned aircraft so that it can safely land at a landing location with the distance to the landing runway and the altitude of the unmanned aircraft integrally taken into consideration.

However, the system for automatically landing an aircraft having the above-described construction has a defect in that high cost equipment needs to be installed on the ground so as to radiate the radar waves.

Furthermore, there is a problem in that radar waves are easily exposed to disturbances which interrupt the radio waves.

SUMMARY OF THE INVENTION

Accordingly, the present invention has been made keeping in mind the above problems occurring in the prior art, and an object of the present invention is to provide a system for automatically landing an aircraft using image signals, which is capable of detecting, using image signals, the deformation of the shape of a landing mark at a landing location on the ground that occurs as the attitude and location of the aircraft vary and automatically landing the aircraft at the landing location, and a method of controlling the system.

In order to accomplish the above object, the present invention provides a system for automatically landing an aircraft using image signals, including an altimeter installed on the aircraft, and configured to measure the altitude of the aircraft; a landing mark placed at a landing location on a landing runway; a camera installed on the aircraft, oriented toward the front of the aircraft, and configured to detect the shape of the landing mark in the form of image information; and a FCC (Flight Control Computer) configured to calculate the angle between the aircraft and the ground, the ground range between the aircraft and the landing location and the slant range between the aircraft and the landing location using the altitude information measured by the altimeter, the image information of the landing mark captured by the camera, angle information composed of the pitch, roll and yaw angles of the aircraft, and the angle of entry into the landing runway, and configured to control automatic landing of the aircraft.

The image information may include the horizontal and vertical lengths of the landing mark captured by the camera.

The altimeter may include a radio wave altimeter.

The landing mark may be painted with luminous paint.

The camera may include an infrared camera.

In order to accomplish the above object, the present invention provides a method of controlling a system for automatically landing an aircraft using image signals, including an altitude measurement step of a FCC of the aircraft receiving the altitude information of the aircraft from an altimeter; a landing mark recognition step of a camera installed in the aircraft and oriented toward the front of the aircraft capturing a landing mark at a landing location and transmitting it to the FCC; a landing mark measurement step of the FCC measuring the lateral and vertical lengths of the landing mark captured by the camera; a flight information calculation step of the FCC of the aircraft calculating the angle between the aircraft and the ground, the ground range between the aircraft and the landing location and the slant range between the aircraft and the landing location using the altitude information, the horizontal and vertical lengths of the landing mark measured at the landing mark measurement step, angle information composed of the pitch, roll and yaw angles of the aircraft and the angle of entry to a landing runway; and a flight control step of controlling the flight and attitude of the aircraft using the calculated flight information.

At the flight information calculation step, the angle θ between the aircraft and the ground may be calculated using Equation 1, the ground range GR between the aircraft and the landing location may be calculated using Equation 2, and the slant range SR between the aircraft and the landing location may be calculated using Equations 3 or 4:

$$\theta = \tan^{-1}(y'' \cos(\delta)\cos(\alpha)/(x' \cos(\beta))) \quad (1)$$

$$GR = h^* x' \cos(\beta)/(y'' \cos(\delta)\cos(\alpha)) \quad (2)$$

$$SR = h/\sin(\tan^{-1}(y'' \cos(\delta)\cos(\alpha)/(x' \cos(\beta)))) \quad (3)$$

$$SR = GR/\cos(\tan^{-1}(y'' \cos(\delta)\cos(\alpha)/(x' \cos(\beta)))) \quad (4)$$

where α: the pitch angle,

β: the roll angle,

δ: the yaw angle, x: the horizontal length of the landing mark measured from the image information recognized by the camera, $$x' = x/\cos(\beta),$$

y: the vertical length of the landing mark measured from the image information recognized by the camera, $$y' = y/\cos(\alpha),$$

$$y'' = y'/\cos(\delta), \text{ and}$$

h: the altitude information measured by the altimeter

At the flight information calculation step, calculating a ground range d1 to a nearest point that makes the angle of entry into the landing runway ψ zero at a current location using Equation 5 may be further included:

$$d1 = (GR - D/2) * \sin(\psi) \quad (5)$$

where ψ: the angle of entry into the landing runway, and
D: the actual diameter of the circle of the landing mark

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
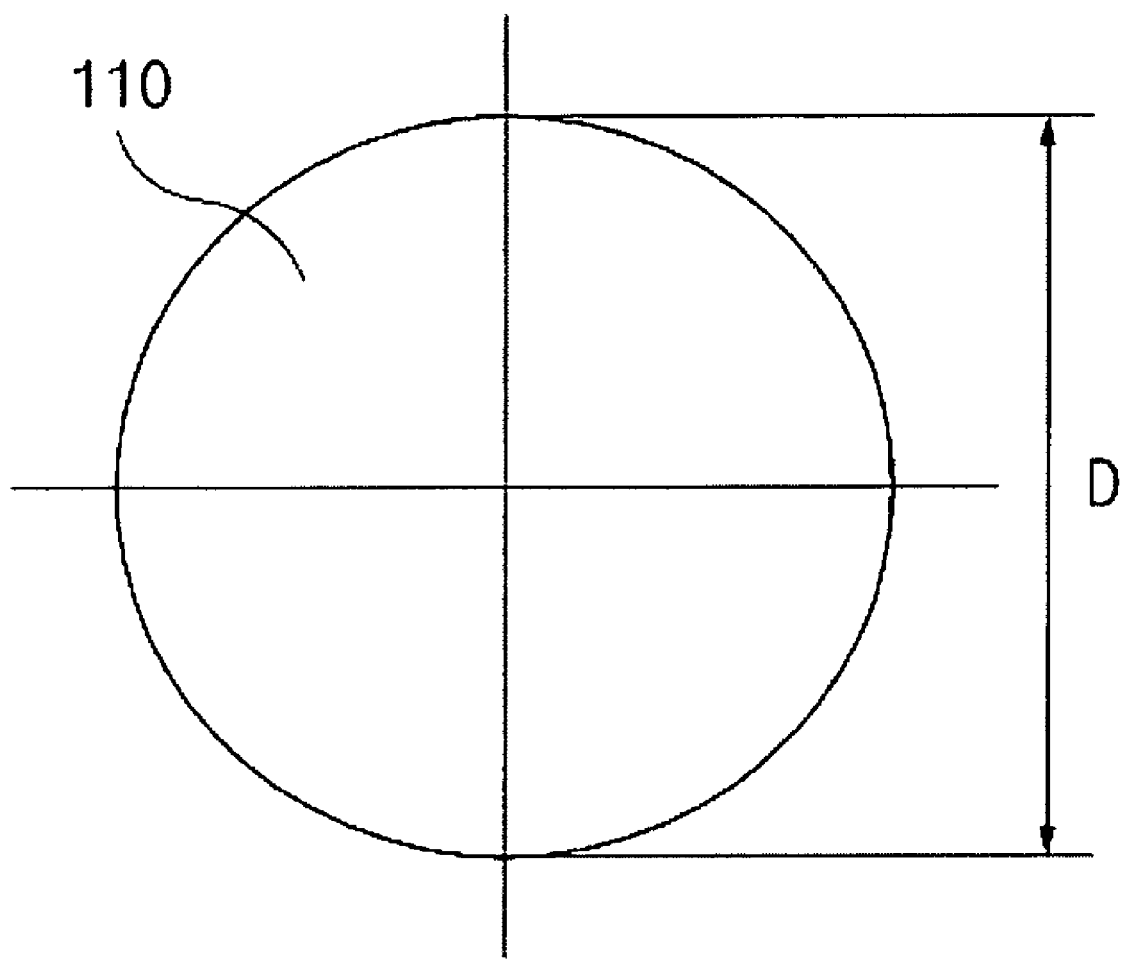
FIG. 1 is a plan view showing a landing mark for a system for automatically landing an aircraft using image signals according to the present invention.

Reference now should be made to the drawings, in which the same reference numerals are used throughout the different drawings to designate the same or similar components.

Preferred embodiments of the present invention will be described in detail below with reference to the accompanying drawings. Prior to the description, it should be noted that the terms and words used in the present specification and the attached claims should not be interpreted as having common meanings or meanings in a dictionary but should be interpreted as having meanings suitable for the technical spirit of the present invention on the basis of the principle in which an inventor can appropriately define the concepts of terms in order to describe his or her invention in the best way.

Figure 2:
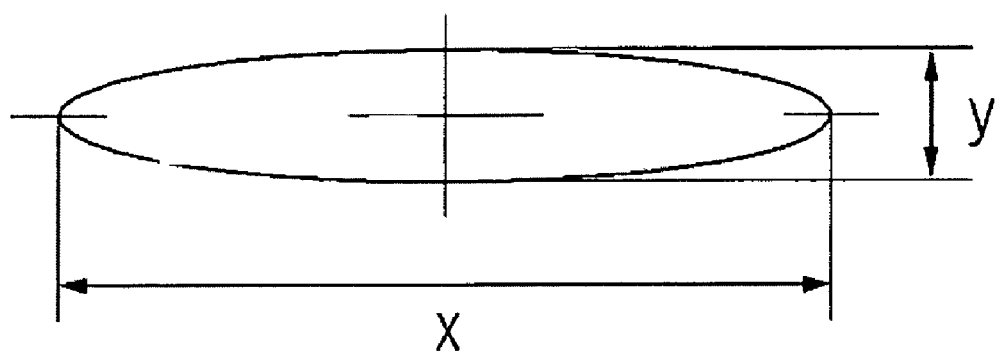
FIG. 2 is a plan view showing the shape of the landing mark that is captured by the camera of an aircraft.

FIG. 1 is a plan view showing a landing mark for a system for automatically landing an aircraft using image signals according to the present invention, and FIG. 2 is a plan view showing the shape of the landing mark that is captured by the camera of the aircraft.

The system for automatically landing an aircraft using image signals according to the present invention includes an altimeter installed on the aircraft, and configured to measure an altitude of the aircraft; a landing mark placed at a landing location on a landing runway; a camera installed on the aircraft, oriented toward the front of the aircraft, and configured to detect the shape of the landing mark in the form of image information; and a FCC(Flight Control Computer) configured to calculate the angle θ between the aircraft and the ground, the ground range GR between the aircraft and the landing location and the slant range SR between the aircraft and the landing location using the altitude information measured by the altimeter, the image information of the landing mark captured by the camera, angle information composed of the pitch, roll and yaw angles of the aircraft, and an angle of entry into the landing runway, and configured to control automatic landing of the aircraft.

In the present embodiment, the aircraft may include an unmanned aircraft.

The altimeter may be a radio wave altimeter. That is, in order to provide a precise altitude value even when the altitude is reduced, the radio wave altimeter may be installed. In the present embodiment, it is possible to purchase MK5 (transmission frequency: 76 GHz, resolution: 0.02 m) or MK4 (transmission frequency: 13 GHz, resolution: 0.2 m) manufactured by Roke Manor Research Ltd. in the United Kingdom and use it as the radio wave altimeter.

The landing mark may be provided in a circular form. That is, it is preferred that the landing mark be a target plate on which a circle with a diameter of 10 m has been drawn, as shown in FIG. 1. Furthermore, it is preferred that the landing mark be painted with luminous paint so that it can be recognized at nighttime.

In the present embodiment, the camera may be a monochrome camera having a 480*640 specification. It will be apparent that the camera may be an infrared camera in order to improve precision, even though the target plate is painted with the luminous paint. Furthermore, the camera must be installed such that it is oriented toward the front of the aircraft in order to reduce errors.

The image information includes the horizontal and vertical lengths of the landing mark captured by the camera. That is, when an image of the landing mark is captured in the direction of movement of the aircraft, the circular shape of the landing mark on the ground looks like an elliptical shape, as shown in FIG. 2, and the horizontal length x and vertical length y of the landing mark measured by the camera vary with the distance between the aircraft and the landing mark, and the pitch angle, roll angle and yaw angle of the aircraft. However, if x<y, that is, θ>45°, in FIG. 3, error can be increased.

The operation and effect of the system for automatically landing an aircraft using image signals according to the present invention will be described below.

FIGS. 3 to 6 are diagrams showing methods of calculating the angle between an aircraft and the ground, the ground range between the aircraft and a landing location and the slant range between the aircraft and the landing location on the basis of a pitch angle (FIG. 4), a roll angle (FIG. 5), a yaw angle (FIG. 6), and the angle between the direction of movement of the aircraft and the direction of entry into a landing runway in a method of controlling the system for automatically landing an aircraft using image signals. FIG. 7 is a diagram showing a method of calculating a ground range d1 to the nearest point that makes the angle of entry into a landing runway zero at a current location on the basis of the angle between the direction of movement of an aircraft and the direction of entry into the landing runway in a method of controlling the system for automatically landing an aircraft using image signals according to the present invention.

In FIGS. 3 to 7, dotted line F indicates the direction of movement of an aircraft.

The method of controlling a system for automatically landing an aircraft using image signals according to the present invention includes an altitude measurement step of a FCC of the aircraft receiving altitude information of the aircraft from an altimeter; a landing mark recognition step of a camera installed in the aircraft and oriented toward the front of the aircraft capturing a landing mark at a landing location and transmitting it to the FCC; a landing mark measurement step of the FCC measuring the horizontal and vertical lengths of the landing mark captured by the camera; a flight information calculation step of the FCC of the aircraft calculating the angle between the aircraft and the ground, the ground range between the aircraft and the landing location and the slant range between the aircraft and the landing location using the altitude information, the horizontal and vertical lengths of the landing mark measured at the landing mark measurement step, angle information composed of the pitch, roll and yaw angles of the aircraft and the angle of entry to a landing runway; and a flight control step of controlling the flight and attitude of the aircraft using the calculated flight information.

The angle of entry into the landing runway $\psi$ is the angle between the direction of movement of the aircraft and the direction of entry into the landing runway.

Figure 3:
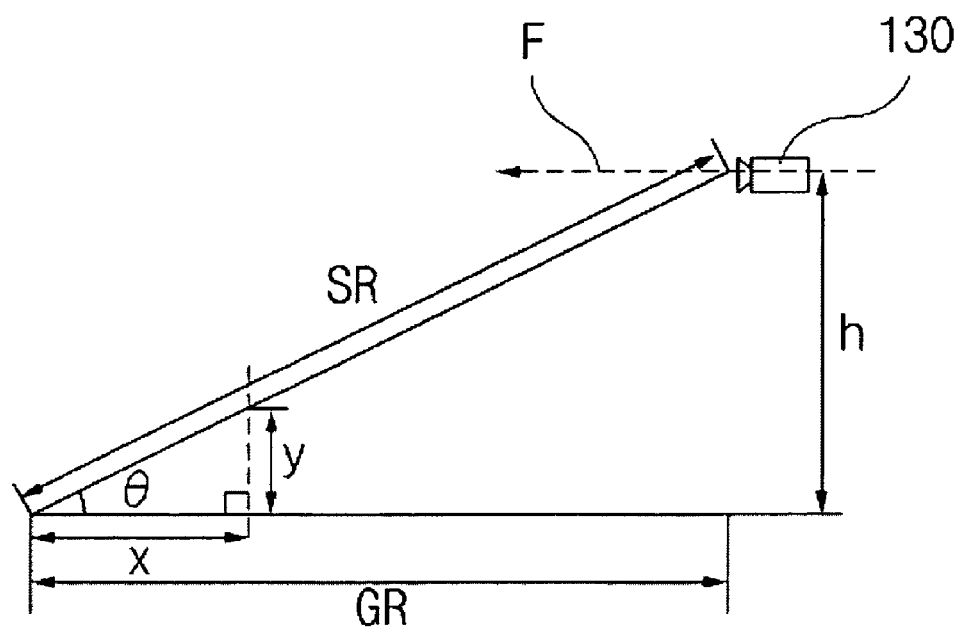
FIGS. 3 to 6 are diagrams showing methods of calculating the angle between an aircraft and the ground, the ground range between the aircraft and a landing location and the slant range between the aircraft and the landing location on the basis of a pitch angle (FIG. 4), a roll angle (FIG. 5), a yaw angle (FIG. 6), and the angle between the direction of movement of the aircraft and the direction of entry into a landing runway in a method of controlling the system for automatically landing an aircraft using image signals.
Figure 4:
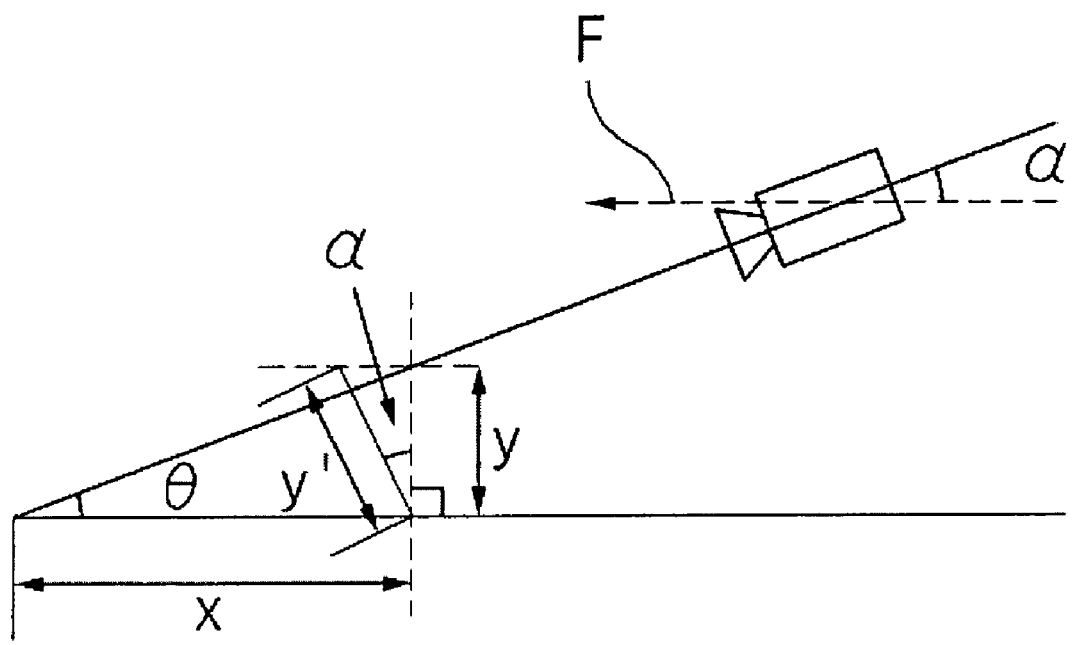

At the flight information calculation step, the angle $\theta$ between the aircraft and the ground is calculated using Equation 1 with reference to FIGS. 3 and 4, the ground range GR between the aircraft and the landing location is calculated using Equation 2, and the slant range SR between the aircraft and the landing location is calculated using Equations 3 or 4.

$$\theta = \tan^{-1}(y'' \cos(\delta)\cos(\alpha)/(x' \cos(\beta))) \quad (1)$$

$$GR = h \cdot x' \cos(\beta)/(y'' \cos(\delta)\cos(\alpha)) \quad (2)$$

$$SR = h/\sin(\tan^{-1}(y'' \cos(\delta)\cos(\alpha)/(x' \cos(\beta)))) \quad (3)$$

$$SR = GR/\cos(\tan^{-1}(y'' \cos(\delta)\cos(\alpha)/(x' \cos(\beta)))) \quad (4)$$

Figure 5:
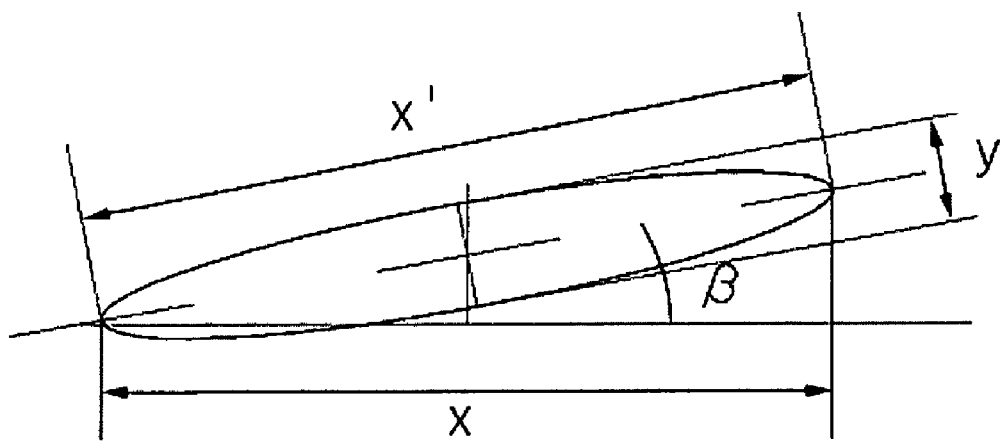
Figure 6:
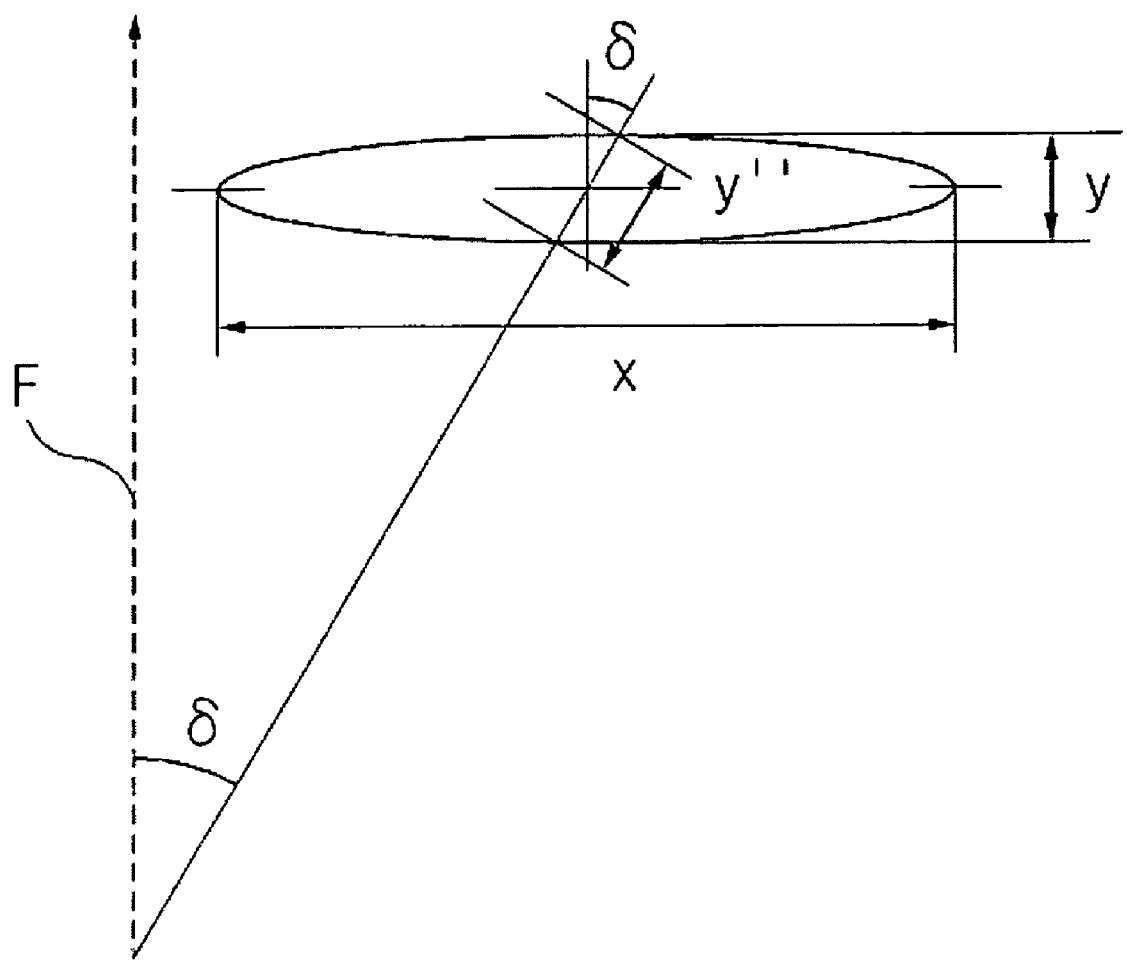
Figure 7:
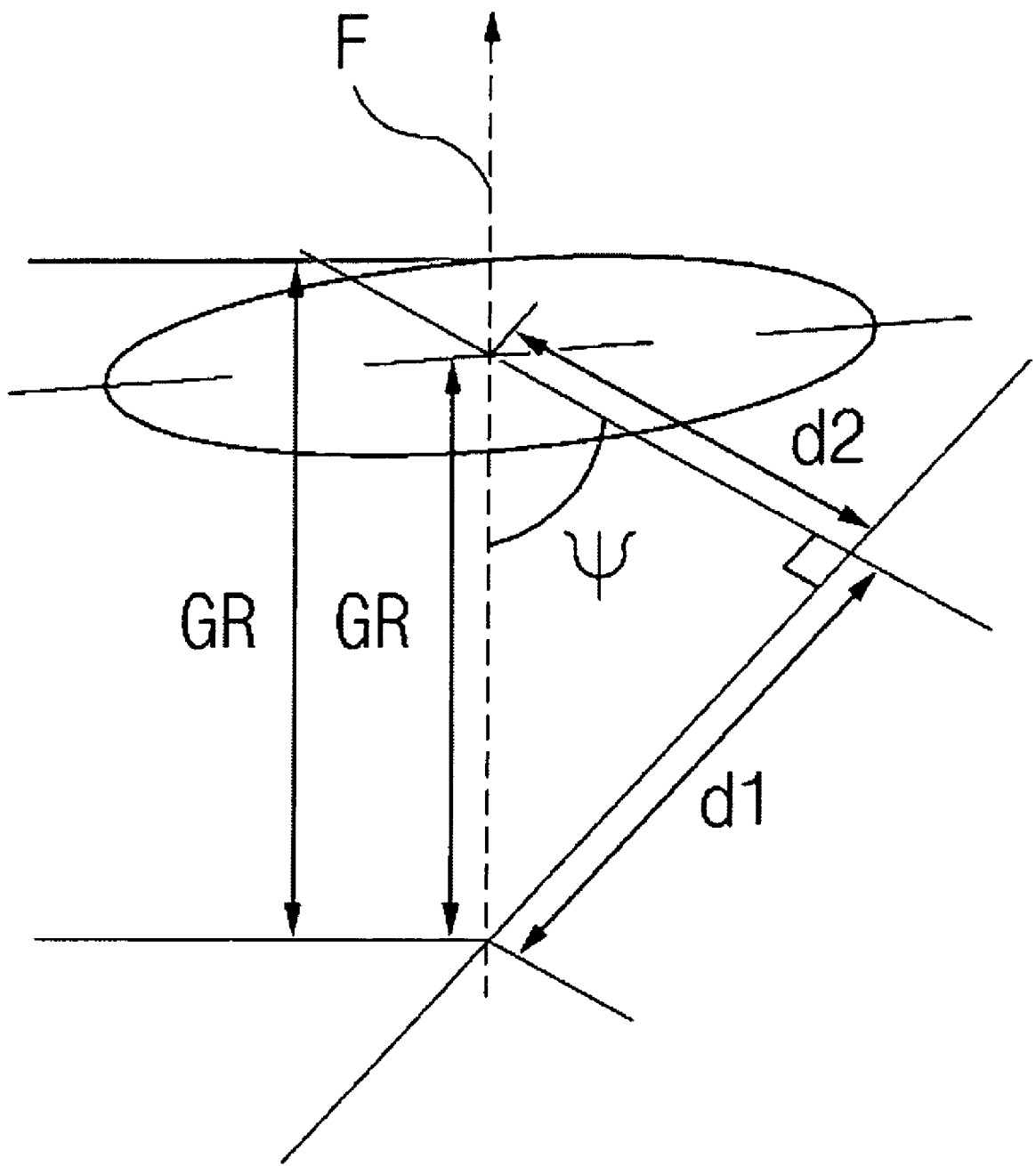
FIG. 7 is a diagram showing a method of calculating a ground range to the nearest point that makes the angle of entry into a landing runway zero at a current location on the basis of the angle between the direction of movement of an aircraft and the direction of entry into the landing runway in a method of controlling the system for automatically landing an aircraft using image signals according to the present invention.

In Equations 1 to 4,
$\alpha$: the pitch angle,
$\beta$: the roll angle,
$\delta$: the yaw angle,
x: the horizontal length of the landing mark measured from the image information recognized by the camera, $x' = x/\cos(\beta)$, y: the vertical length of the landing mark measured from the image information recognized by the camera, $y' = y/\cos(\alpha)$, $y'' = y'/\cos(\delta)$, and h: the altitude information measured by the altimeter Furthermore, at the flight information calculation step, if the angle of entry into the landing runway $\psi$ is not 0, calculating the ground range to the nearest point d1 that makes the angle of entry into the landing runway $\psi$ zero at a current location using Equation 5 is further included.

$$d1 = (GR - D/2) \cdot \sin(\psi) \quad (5)$$

where $\psi$: the angle of entry into the landing runway, and
D: the actual diameter of the circle of the landing mark As shown in FIG. 3, in the case where y=0.5 cm and x=1 cm when D=10 m, the pitch angle $\alpha=0°$, the roll angle $\beta=0°$, the yaw angle $\delta=0°$, the angle of entry into the landing runway $\psi=0°$ and h=300 m, $y/x = 0.5$ $\theta = \tan^{-1}(y/x) = 26.57°$ $GR = h \cdot x/y = 300/0.5 = 600$ m, and $SR = h/\sin(\theta) = 300/\sin(26.57) = 670.70$ m As shown in FIG. 4, in the case where y'=0.5 cm and x=1 cm when D=10 m, the pitch angle $\alpha=+10°$, the roll angle $\beta=0°$, the yaw angle $\delta=0°$, the angle of entry into the landing runway $\psi=0°$ and h=300 m, $y = y' \cos(\alpha) = 0.5 \cdot \cos(10) = 0.4924$ cm $y/x = 0.4924/1 = 0.4924$ $\theta = \tan^{-1}(y/x) = 26.22°$ $GR = h \cdot x/y = 300/0.4924 = 609.26$ m, and $SR = h/\sin(\theta) = 300/\sin(26.22) = 679.01$ m As shown in FIG. 5, in the case where y'=0.5 cm and x'=1 cm when D=10 m, the pitch angle $\alpha=+10°$, the roll angle $\beta=+5°$, the yaw angle $\delta=0°$, the angle of entry into the landing runway $\psi=0°$ and h=300 m, $y = y' \cos(\alpha) = 0.5 \cdot \cos(10) = 0.4924$ cm $x = x' \cos(\beta) = 1 \cdot \cos(5) = 0.9962$ cm $y/x = 0.4924/0.9962 = 0.4943$ $\theta = \tan^{-1}(y/x) = 26.30°$ $GR = h \cdot x/y = 300/0.4943 = 606.92$ m, and $SR = h/\sin(\theta) = 300/\sin(26.30) = 677.09$ m As shown in FIG. 6, in the case where y''=0.5 cm and x'=1 cm when D=10 m, the pitch angle $\alpha=+10°$, the roll angle $\beta=+5°$, the yaw angle $\psi=+5°$, the angle of entry into the landing runway $\psi=0°$ and h=300 m, $y = y'' \cos(\delta)\cos(\alpha) = 0.5 \cdot \cos(5)\cos(10) = 0.4905$ cm $x = x' \cos(\beta) = 1 \cdot \cos(5) = 0.9962$ cm $y/x = 0.4905/0.9962 = 0.4924$ $\theta = \tan^{-1}(y/x) = 26.22°$ $GR = h \cdot y/x = 300/0.4924 = 609.26$ m, and $SR = h/\sin(\theta) = 300/\sin(26.22) = 679.01$ m As shown in FIG. 7, in the case where y'=0.5 cm and x=1 cm when D=10 m, the pitch angle $\alpha=+10°$, the roll angle $\beta=+5°$, the yaw angle $\delta=+5°$, the angle of entry into the landing runway $\psi=20°$ and h=300 m, $d1 = (GR - D/2) \cdot \sin(\psi) = (609.26 - 10/2) \cdot \sin(20) = 206.67$ m, $\theta$, GR and SR are the same as those of FIG. 6, but the angle of entry into the landing runway $\psi$ must be made zero using calculating ground range d1 to the nearest point that makes the angle of entry into the landing runway zero. It is apparent that the distance d2 can be obtained using $d2 = (GR - D/2) \cdot \cos(\psi)$.

Since the system for automatically landing an aircraft using image signals and the method of controlling the system according to the present invention are capable of calculating the angle between the aircraft and the ground, the ground range between the aircraft and the landing location and the slant range between the aircraft and the landing location using a camera for recognizing a landing mark provided at a landing location on the ground and an altimeter for obtaining altitude information, they are advantageous in that the equipment thereof is simple and the cost thereof is reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for automatically landing an aircraft using image signals, comprising:
   an altimeter installed on the aircraft, and configured to measure an altitude of the aircraft;
   a landing mark placed at a landing location on a landing runway;
   a camera installed on the aircraft, oriented toward a front of the aircraft, and configured to detect a shape of the landing mark in a form of image information; and
   a FCC(Flight Control Computer) configured to calculate an angle θ between the aircraft and the ground, a ground range GR between the aircraft and the landing location and a slant range SR between the aircraft and the landing location using the altitude information measured by the altimeter, the image information of the landing mark detected by the camera, and angle information composed of pitch, roll and yaw angles of the aircraft, and configured to control automatic landing of the aircraft, wherein:
   the FCC is further configured to calculate the angle θ between the aircraft and the ground using Equation 1,
   the FCC is further configured to calculate the ground range GR between the aircraft and the landing location using Equation 2, and
   the FCC is further configured to calculate the slant range SR between the aircraft and the landing location using Equations 3 or 4:

$$\theta = \tan^{-1}(y'' \cos(\delta)\cos(\alpha)/(x' \cos(\beta))) \quad (1)$$

$$GR = h*x' \cos(\beta)/(y'' \cos(\delta)\cos(\alpha)) \quad (2)$$

$$SR = h/\sin(\tan^{-1}(y'' \cos(\delta)\cos(\alpha)/(x' \cos(\beta)))) \quad (3)$$

$$SR = GR/\cos(\tan^{-1}(y'' \cos(\delta)\cos(\alpha)/(x' \cos(\beta)))) \quad (4)$$

where α: the pitch angle,
β: the roll angle,
δ: the yaw angle,
x: a horizontal length of the landing mark measured from the image information detected by the camera, $$x' = x/\cos(\beta),$$

y: a vertical length of the landing mark measured from the image information detected by the camera, $$y' = y/\cos(\alpha),$$

$$y'' = y'/\cos(\delta), \text{ and}$$

h: the altitude information measured by the altimeter,
further wherein the FCC is further configured to calculate a ground range d1 to a nearest point that makes an angle of entry into the landing runway ψ zero at a current location using Equation 5:

$$d1 = (GR - D/2)*\sin(\psi) \quad (5)$$

where ψ: a current angle of entry into the landing runway, and
D: an actual diameter of the circle of the landing mark.

2. The system as set forth in claim 1, wherein the image information comprises horizontal and vertical lengths of the landing mark detected by the camera, and at least one of the angle θ between the aircraft and the ground, the ground range GR between the aircraft and the landing location and the slant range SR between the aircraft and the landing location is calculated based in part upon the horizontal and vertical lengths of the landing mark.

3. The system as set forth in claim 1, wherein the altimeter comprises a radio wave altimeter.

4. The system as set forth in claim 2, wherein the landing mark is painted with luminous paint.

5. The system as set forth in claim 1, wherein the camera comprises an infrared camera.

* * * * *